July 19, 1966  J. R. RICHARDS  3,262,092
RANGE AND BEARING RECORDER
Filed July 3, 1951  2 Sheets-Sheet 1
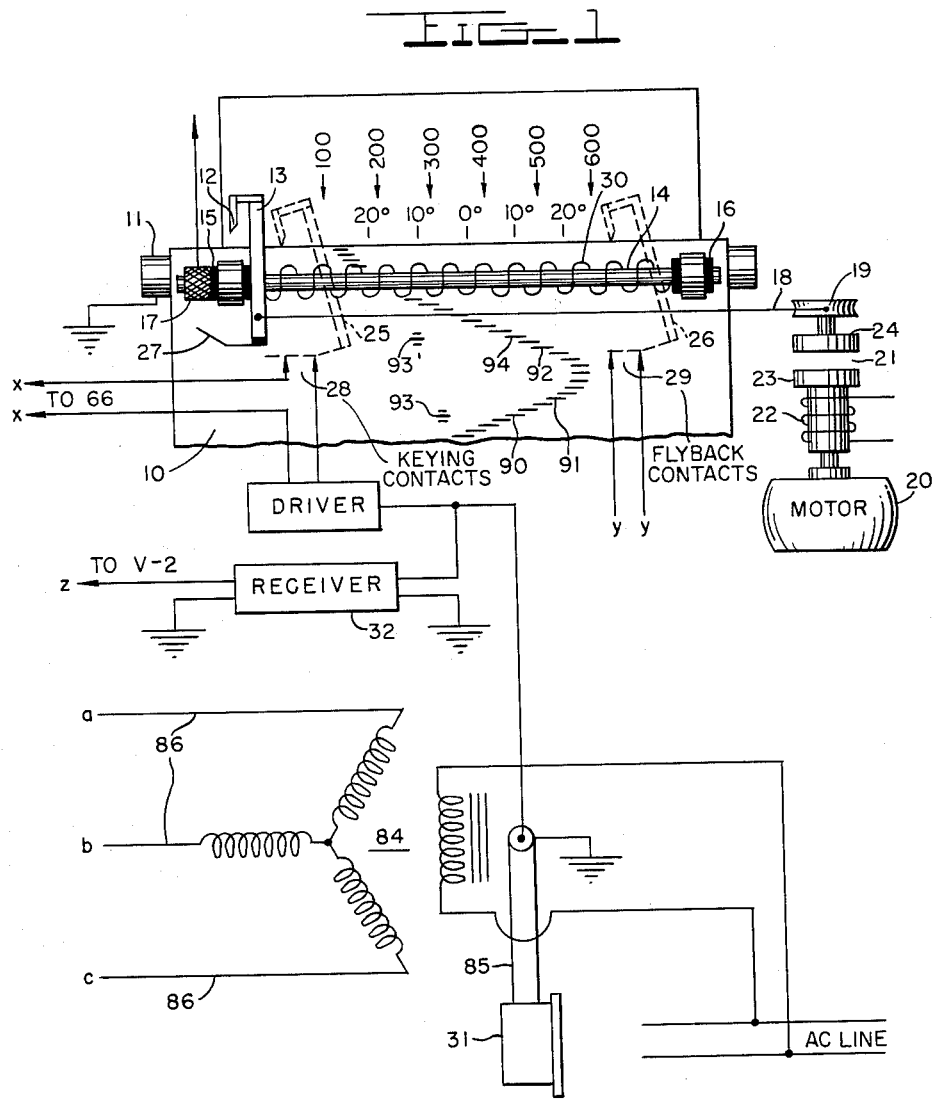
INVENTOR
JAMES R. RICHARDS
BY
ATTORNEYS

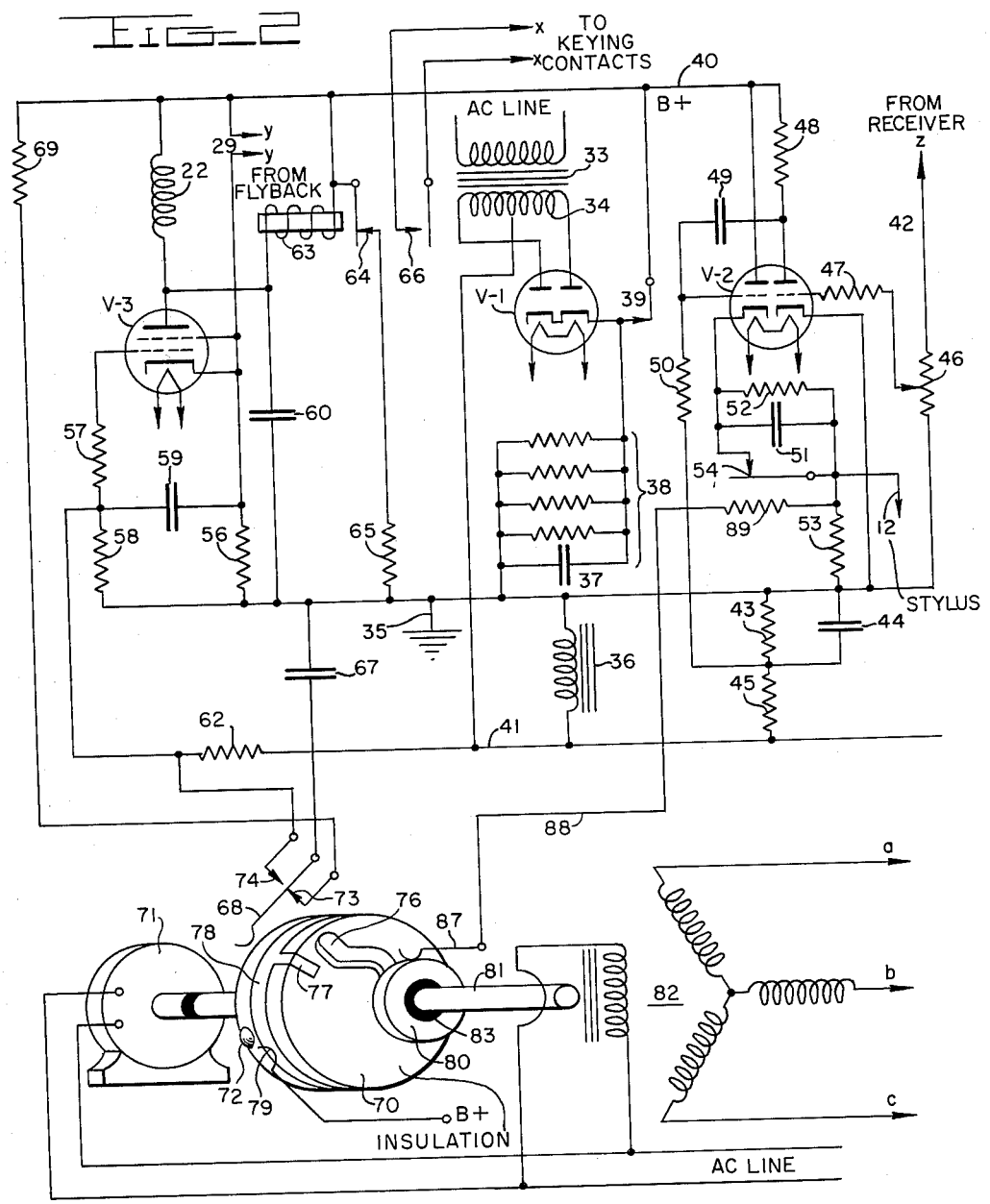

3,262,092
RANGE AND BEARING RECORDER
James R. Richards, Cheverly, Md., assignor to the United
States of America as represented by the Secretary of
the Navy
Filed July 3, 1951, Ser. No. 235,082
9 Claims. (Cl. 340—3)

The invention described herein may be manufactured and used by or for the Government of the United States of America for governmental purposes without the payment of any royalties thereon.

The present invention relates to range and bearing recording systems and has particular application to range and bearing recording systems for use in submarine compressional wave systems.

The principle of echo-ranging and range recording by means of submarine compressional waves is well known and is generally accomplished by synchronously correlating a time base with the transmission of short pulses of the waves and reception of echoes thereof from an object whose range is to be recorded. A suitable time base is usually provided by the motion of a stylus or record marker across a strip of record paper, the latter fed at right angles to the motion of the stylus, and the stylus moving at a constant predetermined speed during a recording stroke. The instant of transmission of the wave energy is marked on the paper, for example, by electrochemical effect produced by passage of a current pulse through the stylus and the paper in known manner. The arrival of a pulse echo is likewise marked, and the interval between the two marks measures the distance between the transmitting source and the reflecting object according to a scale previously marked along the time base in terms of distance based upon the ratio of stylus speed to the speed of propagation of compressional wave energy in water. After a predetermined time limit near the limit of the time base a switch is operated upon movement of the stylus to the position representing such limit which operation brings about a rapid return of the stylus to its starting position which return movement is generally referred to as the fly-back. Operation of the above switch, which may be termed the fly-back switch, sets into operation timing means operable after a given time to effect initiation of a repeat movement of the stylus across the record paper. Timing of the complete cycle is accomplished by a time base generator in the form of a constant speed motor located in the recorder.

With tiltable trainable projectors, the information provided by a recorder of range only as above described must be combined with information about the angular position of the projector. At times this combined information must be continuously referred to, and this is singularly difficult if the respective types of information are given on separate devices. It is highly desirable therefore to have a presentation, on a single instrument, of the angular position of the projector together with the range history of a target in the scanning field of the projector.

An object of the present invention is to provide a recording system which will make possible the presentation of a continuous history of range and bearing information on a single record sheet.

Another object is the provision of overlapping records of range and bearing on a common record sheet capable of substantially instant interpretation.

Various other objects and advantages of the invention will become apparent from a perusal of the following specification and the drawings accompanying the same.

FIG. 1 of the drawings is a schematic diagram of the recorder apparatus of the invention using a common record sheet and record marker for recording both range and bearing.

FIG. 2 is a schematic diagram of the circuit and apparatus for controlling the recorder.

Referring to the drawings in detail, and first to FIG. 1, there is shown a recorder of a generally known type having record surface element in the form of a record sheet 10 drawn over a roller platen 11 with a record marker in the form of a stylus 12 arranged to be drawn across the record from left to right at constant speed to establish a time base. The means for drawing the sheet over the platen, not shown, may be of any known or other suitable form for effecting relative movement of the record continuously or intermittently in a direction transverse to the sweep movement of the stylus. The stylus is carried by a stylus carriage 13 slidable along a metal guide rod 14 insulated from the rest of the machine by means of suitable insulating bushings 15 and 16 in its end supports. The stylus and stylus carriage being formed of metal, circuit connection may be made with the point of the stylus through the carriage, guide rod and the binding post 17 formed at the left hand end extension of the guide rod 14.

Means are provided for moving the carriage along the guide rod from left to right at predetermined speed to effect a timing sweep of the marker stylus over the record surface. This means comprises a tow cord 18 attached to the carriage and pulled by a winding drum 19 adapted to be driven by a constant speed motor 20 through a magnetic clutch 21 energized by a magnetic clutch coil 22 to effect engagement of the driving element 23 with the driven element 24 connected with the drum.

The carriage 13 may be prevented from rotation about the axis of the guide rod by any known or other suitable expedient not shown as by the use of two parallel rods, a square rod, or by splining the carrier on the rod. In any case the carrier is given sufficient angular play in the plane of the rod to permit it to tilt under the pulling force of the tow cord as indicated in dotted lines at the positions 25 and 26, and for a reason to be presently explained. Mounted on the lower end of the carriage and insulated therefrom is a bridging contact element 27 arranged to bridge first the keying contacts 28 and then the fly-back contacts 29 in the course of travel of the carriage from left to right.

In the normal starting position of the carriage, which is that shown in the drawing, the bridging contact 27 assumes a position above the plane of the sets of contacts 28 and 29. Upon operation of the drum to move the carriage from left to right, tension on the tow cord tilts the carriage as shown at 25 and 26 to bring the bridging contact element down to the plane of the contacts 28 and 29. Upon release of the clutch and with negligible tension on the tow cord the carriage is returned to the starting position shown by force of the compression spring 30 compressed during right hand movement of the carriage.

Release of tension on the tow cord during return movement of the carriage permits the latter to assume the vertical position raising the bridging contact 27 and thus preventing circuit closure through the keying contacts 28 upon fly-back. The keying contacts 28 control the keying of a driver for an underwater compressional wave transducer 31, the contacts 28 effecting such control jointly with a relay contact in the control circuit described below. A suitable electrical signal receiver 32 receives electrical signals from the transducer in known manner for transmission to the control circuit. The transducer 31 acts both as a sound projector for projecting a pulse or pulses of compressional wave energy and as a directive receiver for receiving an echo of such a pulse from an object in the line of reception of the transducer acting as a receiver.

The control circuit now to be described is shown diagrammatically in FIG. 2. Here power supply is provided by transformer 33 whose high voltage secondary winding 34 supplies, for example, 460 volts A.C. directly to the plate of a full wave rectifier tube V–1 which may be a 6X56T gas tube. Current supply for the heaters of the twin diode tube V–1 may be of any known or other suitable form of low voltage alternating current supply not shown. Such low voltage heater current may be derived from a third winding on the power transformer 33 not shown and which may be provided in known manner. The midpoint of the transformer winding 34 is connected to ground 35 through a filter choke 36, the remainder of the filter combination consisting of the 30 microfarad condenser 37. A fixed 20,000 ohm bleeder resistance 38, comprised of four 80,000 ohm resistances connected in parallel, limits the peak D.C. voltage of the system. At standby with the main switch contact 39 closed and 117 volts A.C. supplied to the primary of the transformer, the D.C. voltage on the high voltage supply line 40 will be approximately 200 volts. At full power output the voltage drops to approximately 165. The filter choke 36 being interposed between the mid-point of the rectifier winding 34 and ground, gives such mid-point and consequently the conductor 41, with which it is directly connected, a negative D.C. potential with respect to ground. This affords a negative potential supply for use in manner presently described.

The system includes a signal amplifier receiver comprised of the twin triode tube V–2 in the present instance a 6SN7GT with suitable circuit components for reception and amplification of signals incoming over the input conductor 42 from the receiver 32 of FIG. 1, as indicated by connecting points Z to transmit a recording pulse of D.C. current to the stylus point 12 of the recorder shown diagrammatically in FIG. 1. A one megohm resistor 43 shunted by a 24 microfarad condenser 44 is placed in series with a .25 megohm resistor 45 providing a potential of minus 12 volts to ground across the resistor. This value obtains only when the recorder is running normally, the long, time constant of the filter combination eliminating transients in the bias during flyback of the stylus. A 50,000 ohm potentiometer 46 connected between the signal conductor 42 and ground has its adjustable tap or brush connected through an 80,000 ohm resistor 47 to the grid of the right hand section of the twin triode V–2. The cathode of this triode section is at ground potential, while the anode is connected to the high voltage supply line 40 through an 80,000 ohm resistor 48. This circuit provides a voltage amplifier which is sensitive only to negative swings of the alternating current signal applied to the control grid.

The anode of this right hand section of the twin triode is coupled to the control grid of the left hand section by a .001 microfarad condenser 49, this grid being biased through a one megohm resistor 50 at minus 12 volts. The left hand triode section is operated as a cathode follower, the anode being connected directly to the positive high voltage supply conductor 40 and the cathode through the stylus circuit to ground. In series with the cathode and stylus 12 is a 24 microfarad electrolytic condenser 51 shunted by a 30,000 ohm carbon resistor 52, the stylus being shunted to ground by a 30,000 ohm resistance 53. Thus amplified signals applied to the left hand triode grid result in elevation of the cathode with respect to ground with consequent current flow through the resistor-capacitor combination and through the stylus and the record sheet to ground with resultant visible chemical reaction to make a mark on the record, indicating range. The charge developed on the condenser prevents further current flow unless the cathode potential exceeds the potential of the charge remaining on the condenser. This results in that reverberation and back-ground noise build up a potential across the capacitor immediately after transmission of a pulse from the ship's transducer. Any further noise can not record since current flow in the circuit combination unless the received signal produces a cathode potential greater than that on the capacitor. This in turn is determined by the magnitude of the earlier received signal impulses and the time constant of the resistor-capacitor combination. Because under some conditions it is undesirable to employ the noise suppression circuit just described, a normally open shunting switch 54 is provided for establishing a short circuit around the resistance capacitor combination. A 30,000 ohm resistor 53 connects the stylus to ground to provide a sharp cutoff for the output triode. The control circuit above described thus provides a marker control responsive to reception of an echo by the transducer 31 acting as a directive receiver.

The control circuit for the mechanical operation of the recorder and consequently the transmission of the searching pulses of compressional waves makes use of type 2050 gas tetrode V–3 controlling energization of the clutch-magnet winding 22. The winding which in the present instance has a resistance of approximately 400 ohms, is connected between the positive high voltage supply line 40 and the anode of the tube V–3. The circuit to ground from the cathode of this tube is completed through a 2,000 ohm wire wound resistor 56. The grid of the gas tube is connected to ground through a 5 megohm resistor 57 and a one megohm resistor 58, a 0.1 microfarad condenser 59 coupling the junction of these two resistors to the cathode. The action of the current flowing in the cathode circuit is to impress a potential of approximately 100 volts across the condenser, the cathode side of the condenser being positive to the grid side. Closure of the flyback contacts 29, through connection points YY, directly connects the high voltage D.C. line to the cathode effecting a short circuit across the magnetic clutch coil 22 and gas tube V–3 which brings the current through the combination to zero and deionizes or extinguishes the tube. The clutch coil 22, constant speed motor 20 and flyback contacts 29, thus constitute time controlled means energized in the anode circuit of the gas tube for extinguishing the tube after a given time. De-energization of the coil 22 of course permits the stylus to fly back to starting position. A 0.6 microfarad condenser 60 connected from the anode of the gas tube to ground assists in the deenergization of the tube, by offering an outlet for the inductive energy of the clutch winding 22. Upon opening of the flyback contacts the cathode at once drops to ground potential. The condenser 59 still 100 volts negative with respect to the cathode or ground, holds the grid at this same potential with respect to the cathode so that the tube, for the time being, will not ionize.

The condenser at once commences discharging slowly through the bleeder circuit comprised of the one megohm grid resistor 58 and the 2,000 ohm cathode resistor 56. However, negative bias is maintained on the control grid of the gas tube V–3 from the negative supply conductor 41 through a limiting one megohm resistance 62 to the junction of condenser 59 with grid resistance 57. To enhance this bias a 1,000 ohm quick acting relay 63 connected in parallel with the clutch coil 22, maintains through a back contact 64 a load across the power conductor 40 and ground through a 2,500 ohm resistance 65 when the tube is not conducting. This puts a drop of 19 volts minus to ground across the filter choke 36. The gas tube is thus normally blocked. A normally open front contact 66 on the relay 63 controls jointly with the keying contacts 28 on the recorder, through connection points XX, the keying of the driver for the transducer 31.

Now for automatically firing the control tube V–3 at predetermined intervals and producing a record of the bearing of the projector during each operation of the range recorder independently of the receipt of an echo, there is provided the rotary timing device shown diagrammatically at the bottom portion of FIG. 2. This comprises a timing disk element 70 driven by a constant speed synchronous ratio motor 71 at a rotation periodicity substantially longer than the cycle period of the range recorder so as to allow the recording stylus carriage to make a complete excursion from the zero position back to the zero position in one revolution of the timing disk. The disk 70 is of insulating material and is provided with a cam stud 72 operating a double throw switch comprised of the biased spring switch arm 68 and the stationary normally closed and normally open contacts 73 and 74 respectively. A storage condenser 67 of 0.1 mf. has one terminal grounded and the other normally connected to the positive high voltage supply conductor 40 through the normally closed contact 73 and resistance 69, to maintain the condenser charged to the anode supply voltage. The contact 74 operates upon closure to connect the charged condenser 67 to the grid circuit of the gas tube V–3 to momentarily apply the full positive anode voltage to the grid circuit.

Thus the gas tube is fired each time the cam stud 72 passes under the spring switch arm 68. This causes an energization of the clutch coil 22 and the relay 63. Energization of the clutch coil 22 (FIG. 1) couples the constant speed motor 20 to the winding drum 19 to tilt the stylus carriage 25 as indicated in dotted lines and draw it from left to right at the predetermined constant speed. Tilting of the carriage brings the stylus 12 into contact with the record sheet, and brings the bridging contact 27 into the plane of the keying contacts 28. At an early part of the timed movement of the stylus carriage across the record sheet the bridging contact is brought into engagement with the keying contacts to close for a predetermined short time, the keying circuit of the driver, this circuit having been readied by closure of the normally open front contact 66 on relay 63. The gas tube stays conducting until it is extinguished by closure of the flyback contacts 29 by the bridging contact 27 at the end of the stylus travel as indicated at the right hand end of FIG. 1. Closure of the flyback contacts 29 momentarily completes the short circuit across the clutch coil 22 and the gas tube, deenergizing the clutch coil and relay 63. Immediately upon deenergization of the clutch the carriage flies back, immediately opening the flyback contacts to remove the above mentioned short circuit. However the gas tube remains in the non-conducting condition due to the 19 volts drop around impedance 36 caused by restoration of the load through resistance 65 and back contact 64. The storage condenser 67 having in the meantime taken on a charge upon movement of the switch spring arm 68 out of engagement with contact 74 and into engagement with contact 73, after progression of the cam stud 72 beyond the spring arm 68, readies the circuit for a repetition of the above described operation upon the next closure of contact 74.

In the repetitive operation of the recorder as above described, the range marks such as 93 are recorded, indicating the distance to the target from which the echo is received and any variation in this distance due to relative motion between the target and the transducer.

Now for obtaining a record of the bearing of the target from which each echo record is obtained, a record is made of the angular position in azimuth of the transducer or transducer beam during each cycle of operation of the recorder. To this end there is provided an angle measuring contact element 76 cooperating with the timing disk 70 and consequently in timed relation with the constant speed motor driven in synchronism with the motor 71 from a common A.C. power source, to effect the sending of a recording pulse to the stylus a given time after the start of the recording cycle corresponding to the angular displacement of the transducer beam from a given reference bearing, for example, a zero reference bearing parallel to a ship's keel. The timing disk 70 is of insulating material and a movable contact 77 carried at the face of the disk for engagement with the angle contact 76, is maintained in connection with a positive high voltage supply conductor B+ by way of the slip ring 78 and brush contact 79.

It will be understood that the positive voltage supply conductor B+ may be the same as the conductor 40 or may lead from any direct current source whose negative terminal is connected to the common ground. The angle contact 76 is mounted upon and in electrical contact with a rotatable metal disk 80 for angular adjustment along the circular path of movement of the contact 77. Rotation of the disk 80 and contact 76 in constant angular relation to angular movement of the transducer is effected through the driving shaft 81 of a selsyn motor 82, to which shaft the disk 80 is fixed and from which it may be insulated in any suitable manner as by the insulating bushing 83. A master selsyn motor 84 (FIG. 1) connects with the transducer 31 through a drive shaft 85 which latter may be driven in any known or other suitable manner for effecting angular displacement of the transducer 31 in azimuth. The usual stator connections 86, connect the stators of the motors 82 and 84 through points *a*, *b* and *c*, while the rotors as usual are energized from the common A.C. line. Thus as the transducer 31 is rotated in azimuth the angle contact 76 will follow in equal angular movement. A brush contact 87 maintains electrical connection from the angle contact through the metal disk 80 and over conductor 88 through a suitable current limiting resistance 89 to the stylus 12. Each time the rotating contact 77 engages the angle contact 76 a current pulse is sent from the current source B+ over brush contact 79, slip ring 78, rotating contact 77, angle contact 76, disk 80, brush 87, conductor 88, resistance 89, stylus 12, record sheet 10, and platen 11 to ground. The above arrangement thus predetermines an interval of time from the start of the marker from a given reference point to the time of operation of the marker stylus, proportional to the angular displacement of the transducer 31.

In one mode of operation by way of example it may be assumed that the relative adjustment of parts is such that with the transducer set at zero azimuth or beamed straight ahead, the angle contact 76 will be in position to be engaged by rotating contact 77 after the cam stud 72 has passed under the starting switch arm 68 and a mid-point in the travel of the stylus 12 across the record sheet 10 (FIG. 1) which mid-point lies in vertical alignment with the graduation marked 0° on the graduated platen above the record sheet. Obviously with such an adjustment and the transducer held at zero azimuth, each time the contact 77 engages the angles contact 76 a bearing mark will be made on the record on the zero degree line. As the angle contact is adjusted clockwise with a clockwise or right hand movement of the transducer, engagement of contacts 77 and 76 will occur later in the sweep of the stylus producing bearing marks further to the right of the zero bearing line in proportion to the extent of angular movement of the transducer. Conversely, a training of the transducer to the left of zero azimuth will result in the bearing marks being made on the record sheet to the left of the zero bearing line a distance proportional to the angular displacement of the transducer.

In operation the transducer is trained slowly relative to the time base cycle, say a few degrees per time base cycle insufficient relative to the beam pattern to make appreciable difference in overall sensitivity. Thus with the transducer being trained from left to right past the zero bearing and back through bearing in search of a target as in mine sweeping, there will be made a bearing mark during each scanning cycle at a point on the time base corresponding in distance and direction from the vertical center of the record sheet, to the angular displacement and direction of such displacement of the transducer from zero azimuth. Thus an oscillatory sweeping movement of the transducer at a substantially uniform angular velocity, slow relative to the time-base scanning frequency, would result in a sinuous trace of record marks as indicated at 90, 91, 92, and 94.

Because a bearing mark is made on each forward sweep or scanning movement of the recording stylus, any range mark such as 93 will be accompanied by a bearing mark such as 90 on the same horizontal sweep or scanning movement of the stylus, indicating the bearing position of the transducer beam obtaining during that scanning cycle, which bearing in the present example is about 5° to the right and the range 300 yards. Assuming that the ship carrying the transducer closes the range to the target represented by the record mark 93, widening the bearing slowly to near 10°, then no more echoes representing this target will be received during the continued swing of the transducer to the right and return toward zero bearing, until the occurrence of that scanning cycle during which the transducer returning toward zero bearing arrives at the 10° position as indicated by mark 94, during which cycle another range mark 93' will be recorded at say the 250 yard range.

It will be understood that during the period of operation above described any target farther to the right of that indicated by the record marks 93–93' would have been picked up and recorded twice as the transducer swung farther to the right and back, the two records differing in range and bearing according to the relative motion between ship and target.

While but one specific embodiment of the invention has been herein described for the sake of disclosure it is to be understood that the invention is not limited to such specific embodiments, but contemplates all such modifications and variants thereof as fall fairly within the scope of the appended claims.

What is claimed is:

1. In a range recording system of the type including a record surface element, a record marker movable over said surface element, means for moving said marker over said surface element from a time reference point at a predetermined speed to establish a time base line, means for starting said movement from the reference point, means for projecting a pulse of wave energy in predetermined time relation to the start of said marker from the reference point, directive receiving means for receiving an echo of said pulse from an object in the line of reception of said receiving means, and range marker control means responsive to reception of an echo by said receiving means to operate the marker to make a record mark on the record surface to record the range in terms of lapsed time along said time base line between the sending of the pulse and reception of the echo, the combination of means for effecting angular displacement of the directive receiving means from a given reference angular position, time measuring means for generating a bearing signal after an interval of time beginning with the start of the marker from said time reference point on the time base, said interval being proportional to the angular displacement of the directive receiving means and a second marker control means responsive to said bearing signal independently of said first marker control means to operate the marker to make a record mark on the record surface independently of the range mark, whereby during excursion of the marker along the time base line, in addition to the record mark representing range, another record mark is made at a given distance along the same time base line from said time reference point representing the angular displacement of the receiver.

2. In a range recording system of the type including a record surface element, a record marker and means for effecting a single timing sweep of the same over the record surface element, means for initiating said sweep, means for projecting a pulse of compressional wave energy in predetermined time relation to the initiation of the said single sweep, directive receiving means for receiving an echo of said pulse from an object in the line of reception of said receiving means, and means for operating the record marker to make a mark on the record surface in response to reception of an echo, the combination of means for effecting angular displacement of the directive receiving means independently of said sweep and other means for operating the record marker to make a mark on the record surface displaced from the beginning of said sweep by an amount proportional to said angular displacement.

3. In a range recording system of the type including a record surface element, a record marker and means for effecting a timing sweep of the same over the surface of the record surface element, means for initiating said sweep, means for projecting a pulse of compressional wave energy in predetermined time relation to initiation of the sweep, directive receiving means for receiving an echo of said pulse from an object in the line of reception of said receiving means, and means for operating the record marker to make a mark on the record surface in response to reception of an echo, the combination of movable means movable in proportion to the movement of said record marker, means for effecting angular displacement of the directive receiving means, displacement controlled means movable in proportion to said angular displacement and switching means controlled jointly by said movable means and said displacement controlled means to operate said record marker independently of the reception of an echo at a point in the sweep corresponding to said angular displacement.

4. In a range recording system of the type including a record surface element, a record marker movable over said surface element, a timing motor rotatable at a predetermined angular speed, means for coupling said marker to the timing motor for movement of the marker over the record surface at a predetermined speed, rotary timing means rotated at a speed proportional to that of said timing motor, sweep initiating means controlled in the movement of said rotary timing means for actuating the coupling means to initiate movement of the record marker over the record surface, means movable with the record marker for effecting the projection of a pulse of compressional wave energy in predetermined time relation to initiation of the marker movement, directive receiving means for receiving an echo of said pulse from an object in the line of reception of said receiving means, means for operating the record marker to make a mark on the record surface in response to reception of an echo, and means for effecting angular displacement of the directive receiving means, the combination of a first control element carried by the rotary timing means for rotation therewith, a second control element complementary to the first control element rotatably adjustable in the path of the first control element, means for angularly adjusting the position of said second control element in the path of the first control element in proportion to the angular displacement of the directive receiving means, and means operable upon engagement of said first and second control elements to effect operation of said marker and thereby make a mark on the record surface in the path of the marker over the record surface at a point corresponding to the angular displacement of the directive receiver.

5. A control system as claimed in claim 4 having means for repeatedly operating said sweep initiating means, and means for effecting relative movement of the record surface element transverse to the sweep direction whereby slow continuous angular displacement of the directive receiver of a few degrees per sweep of the record marker will produce a continuous chain of bearing record marks readily distinguishable from the range record marks, the latter occurring at irregular intervals and more sparsely distributed over the record surface.

6. In a range recording system of the type including a record surface element, a record marker movable over the record surface, a constant speed motor, means for coupling the marker to the constant speed motor for effecting a timing sweep of the marker over the record at a predetermined speed, a rotary sequence switch device operated at a speed proportional to that of said constant speed motor, a starter switch element operated by said sequence switch device for effecting operation of said coupling means, means movable with said record marker for effecting the projection of a pulse of compressional waves in predetermined time relation to initiation of the said timing sweep, directive receiving means for receiving an echo of said pulse from an object in the line of reception of said receiving means, and means for operating the record marker to make a mark on the record surface in response to reception of an echo by said receiving means, the combination of a marker switch element operated by said sequence switch device for operating said record marker to make a mark on the record, means for effecting angular displacement of the directive receiving means from a given position, and varying the angular displacement of the closure position of said record marker switch element relative to the closure position of said starter switch element in proportion to the angular displacement of said directive receiver.

7. In a range recording system of the type including a record marker movable along a record sheet from a reference point at constant predetermined speed, with periodically operated starting means for repeatedly starting said movement, means for projecting a pulse of compressional wave energy in predetermined time relation to the starting of the marker movement, directive receiving means for receiving the echo of said pulse from an object in the line of reception of the receiving means, and means responsive to reception of an echo by said receiving means to operate the marker to make a record mark on the record sheet to record the range in terms of lapsed time between the sending of the pulse and reception of the echo, the combination of means for effecting angular displacement of the directive receiving means from a given reference position, time measuring means operated in synchronism with said starting means for generating a timing signal a predetermined time interval after each start of the marker movement, means for varying said interval in proportion to the angular displacement of the directive receiving means and means responsive to said timing signal to operate the marker independently of said first marker control means, whereby during each excursion of the marker across the record sheet a record mark is made independently of reception of an echo at a given distance from the starting reference point representing the angular displacement of the directive receiver.

8. In a range recording system of the type including a marker movable along a record sheet from a reference point at constant predetermined speed, means for starting said movement, means for projecting a pulse of compressional wave energy in predetermined time relation to the starting of said marker movement, directive receiving means for receiving the echo of said pulse from an object in the line of reception of said receiving means, and marker control means responsive to reception of an echo by said receiving means to operate the marker to make a record mark on the record sheet to record the range in terms of lapsed time between the sending of the pulse and reception of the echo, the combination of means for effecting angular displacement of the directive receiving means from a given reference position, time measuring means for measuring out a predetermined interval of time beginning with the start of the marker movement from a given point in its movement along the record sheet, means for varying said interval in proportion to the angular displacement of the directive receiving means, and means operable upon completion of the predetermined interval to operate the marker independently of said first marker control means, whereby during each excursion of the marker across the record sheet a record mark is made at a given distance from the starting reference point representing the angular displacement of the directive receiver independently of reception of an echo.

9. In a pulse echo system wherein a stylus holder is constrained to move over a given path, means to bias said stylus holder for movement along said path in one direction to an initial end thereof, motor means to drive said stylus holder along said path opposite to said one direction, stylus means carried by said stylus holder and responsive to timing signals to mark the position of said stylus along said path, a directional transducer to generate and receive a search signal along a narrow beam, directing means to vary the angular position of said beam from a reference position, active means to simultaneously energize said motor means and said transducer means, range circuit means to generate a first timing pulse upon receipt of an echo of said search signal, bearing circuit means to generate a second timing pulse for each said search signal, timing means to delay said second timing pulse for a period proportional to the angular displacement of said beam from said reference position, and means to apply said first and second timing signals to said stylus means.

References Cited by the Examiner

UNITED STATES PATENTS

| 2,475,363 | 7/1949 | Turner | 177—386.1 |
| 2,540,035 | 1/1951 | Rodman | 177—386.1 |
| 2,750,247 | 6/1956 | Turner | 340—3 |

FOREIGN PATENTS 448,407  6/1936  Great Britain.

CHESTER L. JUSTUS, *Primary Examiner.*

NORMAN H. EVANS, FREDERICK M. STRADER, *Examiners.*

J. R. SPALLA, P. H. BLAUSTEIN, R. A. FARLEY, *Assistant Examiners.*